Nov. 24, 1959  L. C. HAMMOND  2,913,926
BRUSH-TYPE GUARD FOR PRINTER'S SAW
Filed Dec. 12, 1957  3 Sheets-Sheet 1

INVENTOR.
LEE C. HAMMOND
BY
Woodhams Blanchard & Flynn
ATTORNEYS

Nov. 24, 1959     L. C. HAMMOND     2,913,926
BRUSH-TYPE GUARD FOR PRINTER'S SAW

Filed Dec. 12, 1957     3 Sheets-Sheet 2

INVENTOR.
LEE C. HAMMOND
BY
Woodhams Blanchard & Flynn
ATTORNEYS

Nov. 24, 1959  L. C. HAMMOND  2,913,926
BRUSH-TYPE GUARD FOR PRINTER'S SAW
Filed Dec. 12, 1957  3 Sheets-Sheet 3

INVENTOR.
LEE C. HAMMOND
BY
Woodhams Blanchard and Flynn
ATTORNEYS

United States Patent Office 2,913,926
Patented Nov. 24, 1959

2,913,926
BRUSH-TYPE GUARD FOR PRINTER'S SAW

Lee C. Hammond, Kalamazoo, Mich., assignor to Hammond Machinery Builders, Inc., Kalamazoo, Mich., a corporation of Michigan Application December 12, 1957, Serial No. 702,406

3 Claims. (Cl. 74—612)

This invention relates to a guard structure for a table saw and, particularly, to a retractable type of guard structure especially adapted for use with a printer's saw, which structure can, at the election of the operator, be moved into guarding position or out of guarding position, the latter being, if desired, in a manner to leave the entire table top unobstructed.

While certain features of the invention are of relatively wide applicability, the embodiment here chosen for illustrative purposes was designed primarily for use with a printer's saw, and many of the problems which it is intended to solve are problems peculiar to the printing industry. Therefore, the specific disclosure of the invention will proceed in terms of a device applicable to, and used with, a printer's saw, but it will be understood that this specific treatment is for convenience of illustration and is not intended to be limiting.

Table saws are often, if not usually, provided with many different adjustments for both the guard and the saw, which adjustments are employed as needed to fit the saw for different types of work. For example, and with particular reference to the use of a printer's saw, it may be necessary to saw relatively large sheets of material, usually lead alloy, into small pieces or plates of various specific sizes, which plates are required to meet printers' needs.

In conventional saws for this purpose, and particularly in one standard make of printer's saw having a circular blade, the blade supporting arbor is mounted on the saw hanger beneath the door portion of the table, which portion is pivoted upwardly by the saw hanger as said saw is moved upwardly into the proper position for sawing slugs. When said door portion of the table is flush with the remainder of the table, then the blade of the saw is in its plate sawing position and it is desirable to have the surface forward of the gauge bar free from obstruction.

Similarly, various types of guiding devices, including means clamped to the upper surface of the table, are utilized for holding and guiding the parts being sawed. Such devices are removable when it is desired to clear the entire upper surface of the table for sawing plates or large sheets.

All of these requirements provide serious complications in the provision of a suitable guard for the saw blade. For example, such guard must be capable of avoiding interference with the table door as said door is moved upwardly or downwardly, as required, with the saw, and yet said guard must be mounted sufficiently to one side of the saw blade that it will not obstruct the movement of the saw blade with respect to the table, or any work which may be on any part of the table when the saw is being used. Further, since there are some situations where the guard must be removed in its entirety, it is desired that such removal can be effected quickly and easily. Yet it is also desirable that the replacement is equally rapid, easy and, further, that it be accurate. Where a circular saw blade revolves at a high rate of speed, it will often impel metal chips at a high rate of speed. It is possible and common to provide a rigid type of guard enveloping a portion of the saw blade above the table, but clearance must be provided between the guard and the table for introducing the work to the blade. Particles of metal often escape between such a guard and the table top and ricochet off the surface of the table at a dangerous speed and in the general direction of the operator's face. Thus, it has long been desired to provide some kind of further guard structure for the zone between the lower edge of the rigid type guard and the table.

Accordingly, a principal object of the invention has been the provision of a guard structure for the saw blade of a table type saw capable of wide adjustability for a variety of different specific operating conditions.

A further object of the invention has been to provide a guard structure, as aforesaid, which is of particular adaptability to saws used in the printing trade.

A further object of the invention has been to provide a guard structure, as aforesaid, having a guard which can be moved into operating position or out of operating position easily and quickly and without appreciable effort on the part of the machine operator.

A further object of the invention is to provide a structure, as aforesaid, which, if desired, permits movement of the guard into a position entirely below the surface of the table, thereby permitting unlimited extension of a given piece of work beyond the edges of the table in any direction.

A further object of the invention is to provide a guard structure, as aforesaid, which can readily move with a vertically adjustable saw blade, or can be moved independently thereof, as desired by the operator.

A further object of the invention is to provide a guard structure, as aforesaid, which effectively blocks passage of small particles through the normally open zone between the upper surface of the table and the upper side of the work piece passing under the guard, without impeding the movement of the work to the blade of the saw.

A further object of the invention is to provide a guard structure, as aforesaid, upon which a work illuminating light can be conveniently mounted, which will be of sufficient simplicity that it can be manufactured and maintained economically, and which will be strong and sturdy and will not readily get out of operating condition.

Other objects and purposes of the invention will be apparent to persons acquainted with devices of this general type upon the reading of the following disclosure and inspection of the accompanying drawings.

Terminology

Figure 1:
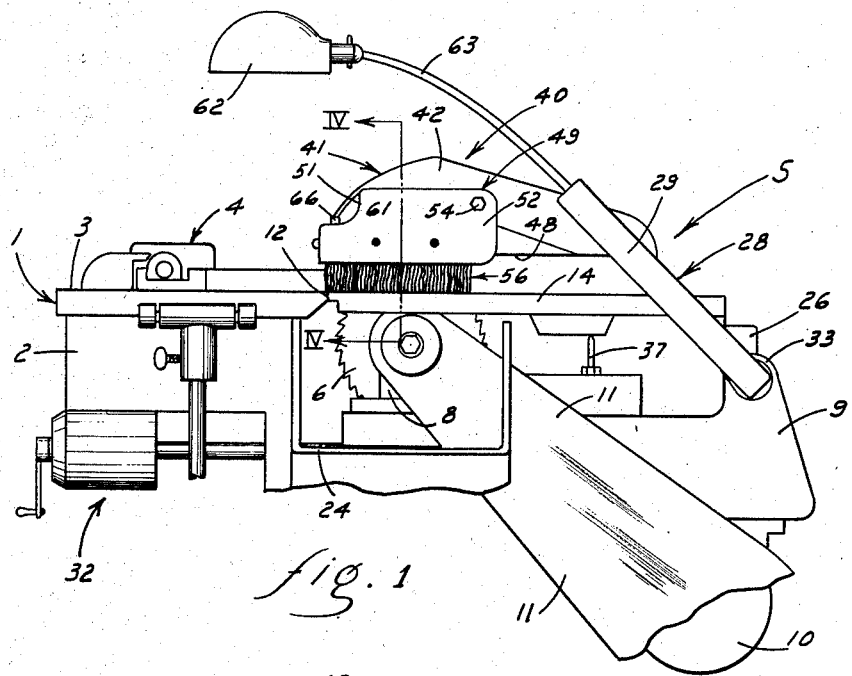
Figure 1 is a side view of the upper portion of a printer's saw embodying the invention.

In proceeding with the following description, certain terminology will be employed for convenience in reference, but it will be understood that such terminology is for convenience only and has no limiting significance. The terms "rightward," "leftward" and derivatives thereof, will refer to such directions as appearing in the particular drawing under consideration at the moment such terminology is used. The terms "forward," "rearward" and derivatives thereof, will refer, respectively, to the end of the saw into which work is normally fed and the end of the saw from which work normally departs, namely, the leftwardly and the rightwardly portions, respectively, of the saw structure as appearing in Figure 1. The terms "upward," "downward," and derivatives thereof, will refer to the saw structure when in its normal position of operation, assuming the table to be horizontally positioned and the saw blade vertically positioned, as shown in the drawings.

General description

In general, the invention contemplates a bearing assembly mounted upon the rearward end of the saw structure and below the surface of the work supporting table. A supporting arm is pivotally mounted in said bearing assembly and extends around one side and the upper edge of the table to a point generally above the saw blade. A cap member or hood is rigidly fastened to said supporting arm so that it can be positioned directly above the saw blade, while being spaced sufficiently above said table that the work to be fed to the saw can readily pass between the cap member and the working surface of the table. A large quantity of relatively fine filaments, such as bristles, are mounted upon, and extend downwardly from, the lower edge of the cap member to a plane parallel with, and very close to, or possibly contacting, the table surface. The filaments extend across at least the front end of the zone between the cap member and the table top, and preferably extend a substantial distance along both sides of the zone. Said filaments, which are of relatively small diameter, such as about one-sixteenth of an inch or less, are provided in sufficient quantity to produce a wall of filaments many times thicker (such as 20 or 30) than the thickness of an individual filament. The body of filaments is of such thickness, having in mind the particular use of the saw or other cutting device associated with the filaments, that a chip, or other particle of cut material, thrown from said saw will not penetrate through the body of filaments, at least not to exit therefrom with any appreciable force.

The filaments are sufficiently flexible that they do not materially impede the movement of a workpiece therethrough. However, it will be understood that where the normal working position of said filaments is other than vertical, the filaments will be sufficiently stiff to be self supporting.

Detailed construction

Figure 2:
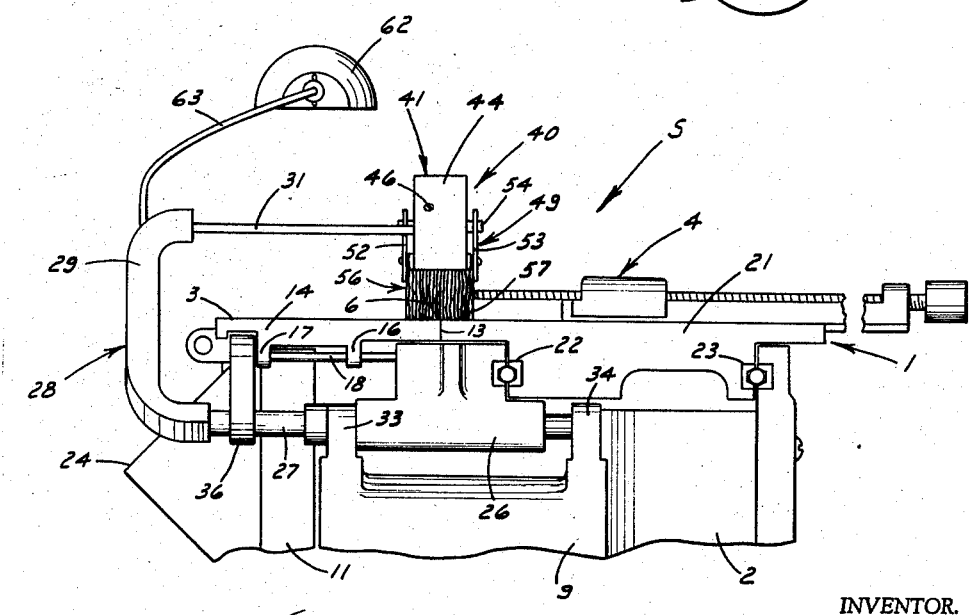
Figure 2 is the rear end view of the said saw shown in Figure 1, which is the rightward end as appearing in Figure 1.
Figure 3:
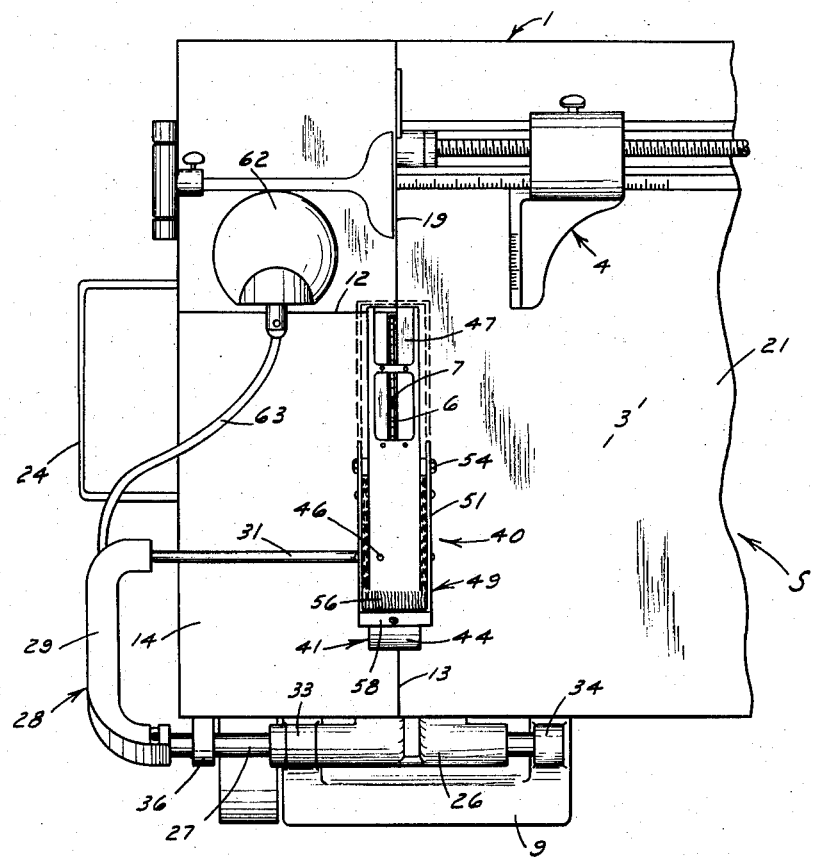
Figure 3 is a top view of the said saw, including the guard structure of the invention.

Referring now to the apparatus selected to illustrate the invention, attention is first directed to the structure of the table saw S (Figures 1, 2 and 3), which forms no part of the invention, as such, and is described herein solely for convenient reference and to aid in a complete understanding of the invention.

Figure 4:
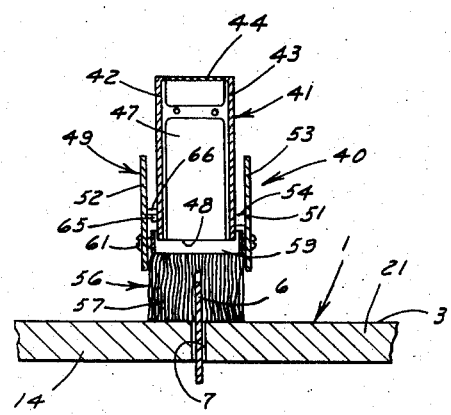
Figure 4 is a sectional view taken on the line IV—IV of Figure 1.
Figure 5:
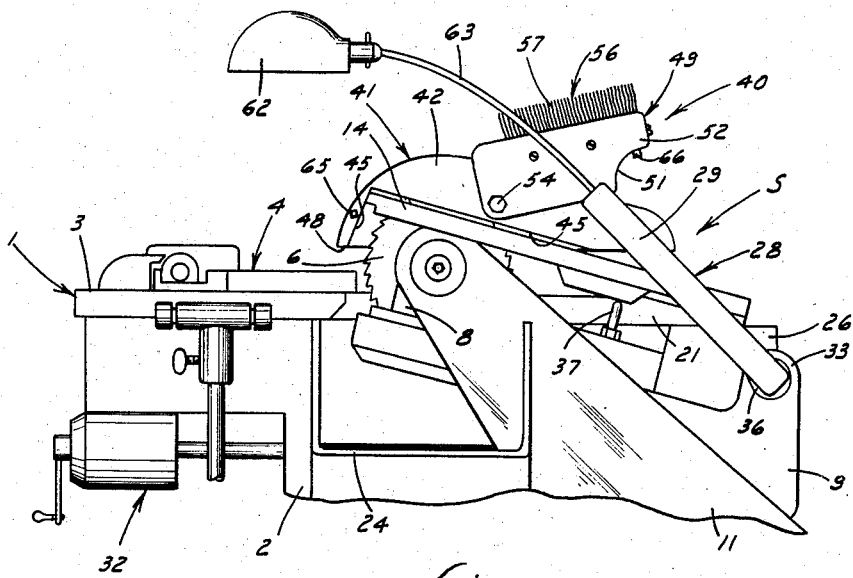
Figure 5 is a view similar to Figure 1, but with the saw arbor, and portion of the table associated therewith, in raised position and with a portion of the guard structure also in raised position.

Said saw S includes a table 1 mounted upon a base structure 2 (Figures 1 and 2) and having a working surface 3 on which is supported any convenient work guiding mechanism 4. A circular saw blade 6, which extends vertically through a suitable slot 7 (Figure 4) in said table, is rotatably supported upon a suitable arbor 8. Said arbor is mounted upon the front end of the combined saw hanger and motor support 9, which is disposed below said table. The saw blade 6 is rotated by suitable drive means including the motor 10, which is supported upon the rear end of the saw hanger 9. A housing 11 covers the motor 10 and drive mechanism associated therewith.

Where the saw involved is a printer's saw, the table will have a door portion 14 which is divided from the rest of the table along the lines 12 and 13 (Figure 3) and is pivotally supported along the rearward edge thereof for movement between the positions shown in Figure 1 and in Figure 5. The pivot structure of said portion 14 includes integral lugs 16 and 17 (Figure 2) pivotally engaging a rod 18 which is secured at one end of the base 2.

The table 1 may be further divided, if desired, along the line 19, said line being a continuation of the line 13. The rightward (Figures 2 and 3) portion 21 of the table may be separately supported upon ball bearing ways 22 and 23 for forward and rearward movement with respect to the base 2 and the remainder of the table, to provide a convenient means for feeding work to the saw blade.

A chute 24 may, if desired, be provided for receiving cut pieces, such as the slugs used in the printing industry.

Turning now to the structure constituting the present invention, there is provided at the rearward end of the base 2, a rearwardly extending boss 26 in which the hanger support rod is non-rotatably held. The shaft 27 comprises one leg of a U-shaped guard support member 28 having a bight 29 and another leg in the form of the rod 31 which is preferably, but not necessarily, substantially parallel with the shaft 27. The saw hanger and motor support 9 is pivotally mounted upon the shaft 27 by means of the arms 33 and 34, which are disposed upon the opposite sides of the boss 26. A supporting bar 36, extends between the shaft 27 and the outer end of the rod 18 and is secured rigidly to both. The bight 29 may be pivotally supported upon the shaft 27 for movement between the positions shown in Figures 1 and 6.

Control mechanism 32 (Figure 1) is provided for effecting pivotal movement of the saw hanger 9 about the axis of the shaft 27. A pin 37 (Figure 5) is adjustably mounted upon the saw hanger 9 for engagement with the under surface of the door portion 14. Thus, the door 14 is automatically raised with the hanger 9 after the saw blade 6 reaches its maximum extent above the table surface 3. Such extent is controlled by adjusting the pin 37.

The guard structure 40 (Figures 1, 2 and 4) includes a hood or cap member 41 having a pair of preferably elongated side plates 42 and 43, and a cover plate 44. The upper leg or rod 31 of the guard support member 28 extends through the side plates 42 and 43 near the rearward ends thereof and adjacent to the cover plate 44. The hood 41 is held with respect to the rod 31 by means of a set screw 46 (Figure 3) extending through the cover plate 44. The hood cover plate 44 preferably curves downwardly at its front end where it has transparent portions 47 through which the saw blade 6 and adjacent portions of the table 1 can be continuously observed when the hood 41 is in the guarding position of Figure 1.

The lower edge portion of the side plate 43 may be cut away to provide a large notch 45 for reception of the adjacent edge of the door 14 when it is raised (Figure 5).

When hood 41 is in the guarding position, its lower edge 48 is spaced from the upper surface 3 of the table 1 a distance sufficient to permit the movement of a workpiece of normal thickness between said hood and said table. A shield 49 is pivotally supported upon the hood 41 to occupy the zone between said hood and said table through which chips cut by the saw blade 6 could otherwise pass.

The shield 49 includes a relatively rigid, U-shaped support frame 51 having legs 52 and 53 which are pivotally supported near their free ends, as by means of the pivot bolts 54, upon the side plates 42 and 43, respectively. Said shield 49 also includes a U-shaped brush 56 comprised of a plurality of filaments 57 which are held against the inner surfaces of the legs 52 and 53 and the web 58 of the support frame 51 by means of the U-shaped element 59 (Figure 4) and the screws 61. The filaments 57 may be of any convenient conventional type, such as hog bristles or synthetic resin bristles, which are resiliently flexible and with sufficient stiffness to absorb and stop the chips of whatever cutting device is involved. Particularly, where the brush is used in a position such that the bristles are normally in a horizontal position, they will be of stiffness at least sufficient to support their own weight without material distortion. Each filament is preferably approximately one-sixteenth of an inch or less in diameter and said filaments are provided in sufficient quantity and sufficiently close together that the body of such filaments has a wall thickness at least several times the thickness of any one of said filaments. In this particular embodiment, the wall thickness of the brush 56 is from 20 to 30 times the thickness of an individual filament.

The brush 56 extends completely across the front or web end of the support frame 51 and continues along the sides of said support frame to points preferably slightly beyond the rearward edge of that portion of the saw blade 6 which extends above the surface 3 of the table 1. The length of the filaments 57 is preferably such that when the hood 41 is in its guarding position the lower, free ends of the filaments 57 are at least close, as within one-quarter inch or less, to the surface 3 of the table 1 and the lower edge of the support frame 51 will define a plane substantially parallel with said upper surface 3 of the table 1.

While the shield 49 in some instances be partially supported by engagement of the brush 56 with the upper surface 3 of the table 1, it is preferable that a stop member 65 (Figures 4 and 5) be secured to the side plate 43 near the front end thereof for engagement by a finger 66 on the leg 53 of support frame 51 near the front end thereof. Thus, the front end of the frame 51 will be supported upon the stop member 65, thereby positively limiting the downward pivotal movement of the shield 49 toward the table 1

A lamp 62 is mounted upon one end of a flexible conduit 63, the other end of which is secured to the guard support member 28 near the upper end of the bight 29. Said conduit 63 is capable of supporting the lamp 62 above the transparent portions 47 of the cover plate 44 for the purpose of directing illumination therethrough upon the saw blade 6 and also upon the adjacent portions of the table 1.

Operation

The elevation of the saw blade 6 is adjusted by the control mechanism 32 operating in a known manner through the saw hanger 9. As in previous practice the door portion 14 is moved upwardly with the hanger 9 after the saw blade reaches a certain elevation. When the door 14 is in its lower (Figure 1) position, substantially parallel with the remainder of the table 1, said table saw S is then arranged for cutting sheets or plate stock in a substantially conventional manner. If the workpiece is of the usual size, the guard support member 28 and the guard structure 40 supported thereon may be located in their Figure 1 positions. In such case, the chip shield 49 will also be in its Figure 1 position, whereby the filaments 57 of the brush 56 will be close to, or possibly engaging, the upper surface 3 of the table 1. As the workpiece is moved by the movable portion 21 of the table 1 toward the leading edge of the saw blade 6, said workpiece will pass between the hood 41 and the table 1, flexing the filaments 57 as it so moves. Accordingly, the brush 56 prevents the chips created by the saw blade 6 from flying outwardly between the hood 41 and the table 1. Although said filaments 57 are flexible enough to permit relatively easy movement of the workpiece through the lower ends thereof, they are sufficiently thickly arranged and stiff intermediate their ends to retard materially, if not completely stop, all of the chips thrown by the saw blade, either directly or ricocheting from the top surface of the table.

Under normal operating conditions, movement of a workpiece through the filaments 57 does not materially change the attitude of the shield 49 with respect to the table 1. Thus, even though a relatively thick workpiece is passing through the front end of the brush 56, the filaments 57 in the rearward portion of the brush 56 will still remain close to, or in engagement with, the table surface 3.

If it becomes desirable to move the shield 49 from its guarding position of Figure 1, the front end of the shield is easily pivoted manually about the pivot bolts 54 into the position shown in Figure 5, wherein the support frame 51 engages the rod 31. Such a positioning of the shield 49 becomes desirable when the saw blade 6 and the pivoted portion 14 of the table 1 is moved into its raised position, as shown in Figure 5. The notch 45 in the side plate 43 receives the leftward (Figure 5) edge of the table portion 14 when it is pivoted upwardly, thus permitting the hood 41 to remain in its guarding position even though the shield 49 has been temporarily removed from its guarding position.

Figure 6:
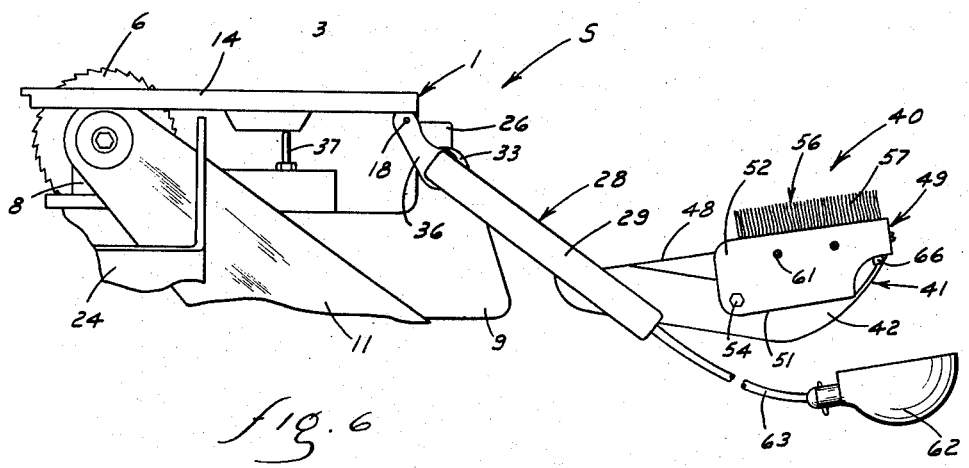
Figure 6 is a fragment of Figure 1, with the guard structure in the completely inoperative position.

If the workpiece to be cut is so large that the guard support member 29 would interfere with the movement of the workpiece toward the saw blade 6, both the guard support 28 and the guard structure 40 may be pivoted about the shaft 27 into the Figure 6 position, where the entire structure is below the upper surface 3 of the table 1, or said parts 28 and 40 can be removed bodily from shaft 27 and in either event the guard support 28 and the guard structure 40 will not interfere with the movement of large sheets along the top surface 3 of the table. Such movement of the guard and guard supporting structures has no effect upon the subsequent or simultanous pivotal movement of the table portion 14.

Although a particular preferred embodiment of the invention has been disclosed in detail hereinabove, it will be understood that variations or modifications of such disclosure, which lie within the scope of the appended claims, are fully contemplated.

In the claims:

1. Guard structure for use with a circular saw blade supported below and extending upwardly through a table, comprising the combination: base means supporting said table; a guard support pivotally mounted upon said base means and being positionable in a location generally above said saw blade; a cap structure mounted on said guard support and adapted to directly overlie said saw blade and be spaced from sad table; and a shield mounted on said cap structure and having a brush extending downwardly therefrom to said surface of said table and substantially surrounding at least the front portion of that part of said saw blade projecting above said table, said shield being pivotally mounted upon said cap structure for movement between one position thereof wherein the brush extends downwardly therefrom and substantially surrounds the saw blade, and another position wherein said brush extends upwardly and said shield rests on said cap structure.

2. In guard structure for a table saw, the combination comprising: a base frame; a work supporting table; a rotatable saw blade extending upwardly through said table; a generally U-shaped guard support member, said member including a first leg extending substantially parallel to the axis of rotation of said saw, said first leg being located adjacent the rear edge of said table and below the upper surface thereof and extending beyond a side edge thereof; means on said base frame pivotally supporting said first leg; said member having a second leg extending substantially parallel to said first leg from a location outwardly of said side edge of said table and being adapted to overlie said table; said member having a web connecting corresponding ends of the legs thereof, said web being spaced outwardly from said side edge of said table; a saw guard mounted on said second leg, said saw guard extending transverse to said second leg and extending downwardly therefrom toward the upper surface of said table, said saw guard being shaped so that it partially surrounds the portion of the saw blade projecting above said table; a shield having yieldable bristles mounted on said saw guard and adapted to rest on the upper surface of said table and at least in part close off the space between said table and said saw guard, said bristles being the sole connection between said saw guard and the upper surface of said table so that workpieces can be moved from the forward edge of said table to and beyond the rearward edge thereof; said saw guard consisting of a pair of side plates substantially parallel with and located on either side of said saw blade and an arcuate top plate connected to said side plates and adapted to overlie said saw blade; said shield having U-shaped plate means, the free ends of the legs of which are pivotally connected to said side plates, said bristles extending downwardly from said plate means and being arranged in U-shape so that they are located on either side of said saw blades and in front thereof.

3. In a printer's table saw having a base and a work supporting table on said base, said table including a detached portion pivotally supported and raisable with respect to the remainder of the table and a rotatable saw blade supported on the underside of said detached portion and vertically adjustable with respect to the remainder of the table by pivotal adjustment of the detached portion of said table, guard structure for said saw blade comprising in combination: a rod extending across the back of said base and means pivotally supporting said rod with respect to said base in a position below said table surface and parallel therewith, said rod constituting the means on which said detached portion is pivotally mounted, and said rod extending laterally beyond the side of said base structure; a bight member affixed to the extended portion of said rod and extending radially to a point spaced upwardly therefrom; a second rod connected to and extending from the other end of said bight member and arranged parallel with said first rod and extending over said table to a point adjacent said saw, a saw guard arranged over said saw and supported on and by said second rod, said saw guard extending transverse to said second rod and opening downwardly therefrom toward the upper surface of said table, and said saw guard being shaped so that a part thereof surrounds at least a portion of that part of the saw blade projecting above said table; whereby when said separable portion of said table is in position co-planar with remainder of said table, the entire table surface is unobstructed except for the protrusion of said saw.

References Cited in the file of this patent

UNITED STATES PATENTS

| | | |
|---|---|---|
| 1,106,920 | Brock | Aug. 11, 1914 |
| 1,836,591 | Hall | Dec. 15, 1931 |
| 2,015,250 | Billker | Sept. 24, 1935 |
| 2,165,953 | Billker et al. | July 11, 1939 |
| 2,343,875 | Schwartz | Mar. 14, 1944 |
| 2,574,900 | Adrian | Nov. 13, 1951 |

OTHER REFERENCES

"Safety As Applied to Grinding Wheels," Norton Co., 51–268. Received Oct. 23, 1911.

American Machinist, May 10, 1945, page 133.